United States Patent
Broucke et al.

(10) Patent No.: US 11,772,210 B2
(45) Date of Patent: Oct. 3, 2023

(54) TOOL FOR INSERTING A FASTENER INTO A STRUCTURE BY INTERFERENCE AND INSTALLATION METHOD FOR INSTALLING A FASTENER IN A STRUCTURE BY INTERFERENCE USING SUCH A TOOL

(71) Applicant: LISI AEROSPACE, Paris (FR)

(72) Inventors: Martial Broucke, Delincourt (FR); Aurélien Montier, Villennes sur Seine (FR)

(73) Assignee: LISI AEROSPACE, Paris (FR)

( * ) Notice: Subject to any disclaimer, the term of this patent is extended or adjusted under 35 U.S.C. 154(b) by 0 days.

(21) Appl. No.: 17/717,149

(22) Filed: Apr. 11, 2022

(65) Prior Publication Data
US 2022/0234149 A1 Jul. 28, 2022

Related U.S. Application Data

(63) Continuation-in-part of application No. PCT/EP2020/079513, filed on Oct. 20, 2020.

(30) Foreign Application Priority Data

Oct. 25, 2019 (FR) ...................................... 1911990

(51) Int. Cl.
*B23P 11/02* (2006.01)
*B23P 19/04* (2006.01)
(Continued)

(52) U.S. Cl.
CPC ................ *B23P 11/02* (2013.01); *B23F 19/04* (2013.01); *B21J 15/32* (2013.01)

(58) Field of Classification Search
CPC ........ B21J 15/32; B21J 15/043; B21J 15/383; B23P 19/04; B23P 11/02; F16B 19/1054; B25B 31/00
See application file for complete search history.

(56) References Cited

U.S. PATENT DOCUMENTS

| 2,717,440 | A * | 9/1955 | Anacker | ................... B21J 15/50 |
| | | | | 227/51 |
| 2009/0053006 | A1* | 2/2009 | Hufnagl | .............. F16B 19/1054 |
| | | | | 81/436 |
| 2014/0130335 | A1* | 5/2014 | Bickford | ............. F16B 19/1072 |
| | | | | 29/525.02 |

FOREIGN PATENT DOCUMENTS

| EP | 1882860 | | 1/2008 | |
| EP | 1882860 | A1 * | 1/2008 | .......... F16B 13/0858 |

(Continued)

OTHER PUBLICATIONS

Sergio De Jesus, E., International Search Report, dated Jan. 21, 2022, 4 pages, European Patent Office, Rijswijk, Netherlands.

(Continued)

*Primary Examiner* — Bayan Salone
(74) *Attorney, Agent, or Firm* — Henricks Slavin LLP

(57) ABSTRACT

A fastener installation tool and method for interference fit, said fastener (10) comprising a head and a grasping element, said tool comprising a first body (30) extending along a first main axis and having: —at least one load-reacting surface, of which one also constitutes a surface for the application of a load; —a load transmission surface, and—a housing extending along the first main axis from a first end of said first body, said housing being extended along the first main axis by a drilling extending from said housing as far as a second end of said first body. According to the invention, the load transmission surface is situated at the second end of the first body (30) and extends perpendicular to the first main axis, said load transmission surface being dimensioned to be able to bear simultaneously on the head and on the insert clamp.

16 Claims, 4 Drawing Sheets

(51) Int. Cl.
*B21J 15/32* (2006.01)
*B23F 19/04* (2006.01)

(56) References Cited

FOREIGN PATENT DOCUMENTS

GB  2143765      2/1985
GB  2143765 A  * 2/1985  ............... B25C 1/02

OTHER PUBLICATIONS

Sergio De Jesus, E., Written Opinion of the International Search Authority, dated Jan. 21, 2022, 7 pages, European Patent Office, Rijswijk, Netherlands.

* cited by examiner

TOOL FOR INSERTING A FASTENER INTO A STRUCTURE BY INTERFERENCE AND INSTALLATION METHOD FOR INSTALLING A FASTENER IN A STRUCTURE BY INTERFERENCE USING SUCH A TOOL

CROSS REFERENCE TO RELATED APPLICATIONS

This application is a continuation-in-part of PCT Application PCT/EP2020/079513 filed Oct. 10, 2020, which claims priority to French Application FR1911990 filed Oct. 25, 2019, the contents of all of which are incorporated herein by reference.

TECHNICAL FIELD

The present invention belongs to the field of fasteners.

More particularly, the invention relates to the field of interference-fit fasteners and relates to a tool and a method for inserting fasteners in interference.

PRIOR ART

Solutions exist to insert a fastener into a bore of a structure without damaging the fastener.

British Patent Application GB 2 143 765 discloses a tool having a telescopic structure for insertion of a nail into a structure. The disclosed tool has a clamping means for holding the nail during attachment, a sleeve and a percussion means. The clamping means is inserted into the sleeve, close to the structure, and the nail is inserted into the clamping means. The percussion means is inserted at the other end of the sleeve; it is in contact with the head of the nail and capable of sliding in said sleeve under the effect of a strike force, generated by means of a hammer, to sink the nail.

One drawback of this tool is that it is not adapted to fasteners comprising a gripping element.

SUMMARY OF THE INVENTION

The present invention relates to a tool for the interference insertion of a fastener into a bore of at least two structures, making it possible to apply a force to the fastener without damaging it. The expression "interference" indicates that the bore of the structures has a diameter less than an outer diameter of the portion of the fastener for assembling the structures.

The invention relates to a tool for interference installation in a bore of a structure of a fastener comprising a head housed in a sleeve flange and a gripping element. The tool includes a first body extending along a first main axis and having:
  at least one load-bearing surface, one of which also forms a load application surface;
  a load transmission surface; and
  a housing extending along the first main axis from a first end of said first body, said housing having a bore extending along the first main axis to a second end of said first body. According to the invention, the load transmission surface is arranged at the second end of the first body and extends perpendicularly to the first main axis, said load transmission surface being dimensioned to bear simultaneously on the head and the sleeve flange.

In one embodiment, the first body comprises a groove extending all along said first body along a direction of the first main axis, and from the first main axis to an outer wall of said body in a radial direction.

In one embodiment, the first body has a U-shaped neck at its second end.

In one embodiment, the second end includes at least two radially flexible fingers.

In one embodiment, the housing is a counterbore having a diameter greater than an average diameter of the bore, said counterbore forming a load-bearing surface and/or an impact surface.

A load applied to the first body is transferred directly to the fastener via the load transmission surface in contact with the head of said fastener, to allow said fastener to be inserted in interference in the structure.

In another embodiment, the tool comprises a second body extending along a second main axis, the second body having a shaft having a shape substantially complementary to the housing of the first body, the second body having at least one surface complementary to at least one load-bearing surface of the first body, and a bore extending along the second main axis from a first end of the second body.

A load applied to the second body is transferred via the at least one complementary surface to the at least one load-bearing surface, and then the loads are transferred to the fastener via the load transmission surface in contact with the head of the at least one fastener, to allow the interference fit of said fastener in the structure.

In one embodiment, the shaft has substantially the shape of a cylindrical sleeve having an outer diameter substantially equal to that of the counterbore and an inner diameter substantially equal to the average diameter of the bore.

In one embodiment, the shaft of the second body includes a groove on its outer wall in which an O-ring adapted to be received in a groove of a wall of the housing of the first body is provided.

In one embodiment, the second body has a load application surface.

The invention also relates to an assembly comprising a tool according to the invention and a fastener comprising a head housed in a sleeve flange and a gripping element.

In one embodiment, the shapes of the housing and the bore of the first body are at least partially complementary to a shape of the gripping element of the fastener, to enable the fastener setting in the first body along the main axis of said first body.

The present invention also relates to a method for installing in interference-fit a fastener in a bore of at least one structure, said fastener comprising a head housed in a sleeve flange and a gripping element, the installation being carried out by means of a tool according to the invention. The installation method according to the invention comprises the following steps:
  placing the fastener in the first body, along the main axis of said first body, so as to contact the head of the fastener and the sleeve flange with the load-transmitting surface;
  positioning the tool comprising the fastener facing the bore of the structure,
  applying a load to a load application surface of the tool to interference fit the fastener into the bore of the structure.

In one embodiment, when placing the fastener into the first body, the gripping element of the fastener is received in the bore of the first body.

In one embodiment, a second body is placed on the first body of the tool, so as to contact at least one load-bearing surface of the first body with at least one complementary surface of the second body, the load being applied to a load application surface of the second body.

In one embodiment, when placing the second body on the first body, the load is applied by means of a tool to a load application surface of the first body or the second body.

DETAILED DESCRIPTION

Figure 1:
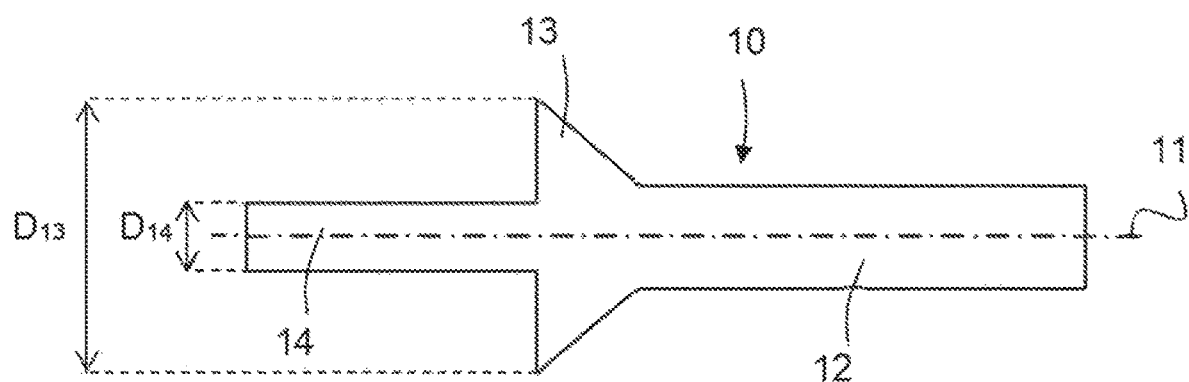
FIG. 1 is a schematic representation of a fastener comprising a smooth portion, a head, and a gripping element.

FIG. 1 schematically shows a fastener 10 to be put in place by interference in a structure by means of a tool 20 according to the invention. The fastener 10 extends along a longitudinal axis 11 and comprises a substantially cylindrical portion 12, a head 13 and a gripping element 14 intended to be separated from the rest of the fastener after installation of said fastener in one or more structures. The head 13 has an outer diameter D13 greater than a maximum outer diameter D14 of the gripping element.

Figure 2:
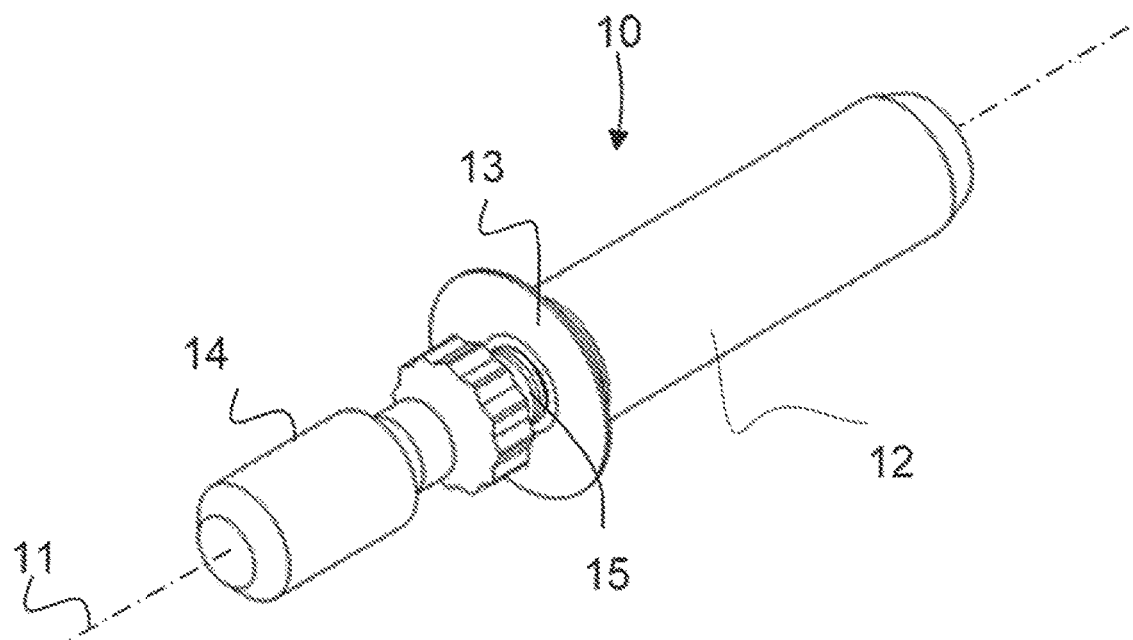
FIG. 2 is a perspective view of a fastener, in the form of a blind rivet.

With reference to FIG. 2, the fastener 10 may for example be a blind rivet comprising a screw inserted into a tapped sleeve 12, said sleeve being able to form an outer bulb under the effect of a traction or a torsion exerted on the gripping element 14. In this case, the head 13 of the fastener is a screw head housed in a flange of complementary shape of the sleeve 12. The cylindrical portion is the body of the screw and of the body of the sleeve 12. In addition to the above-mentioned elements, the rivet 10 may comprise a breaking groove 15 making it possible to facilitate the breaking of the gripping element 14.

Figure 3:
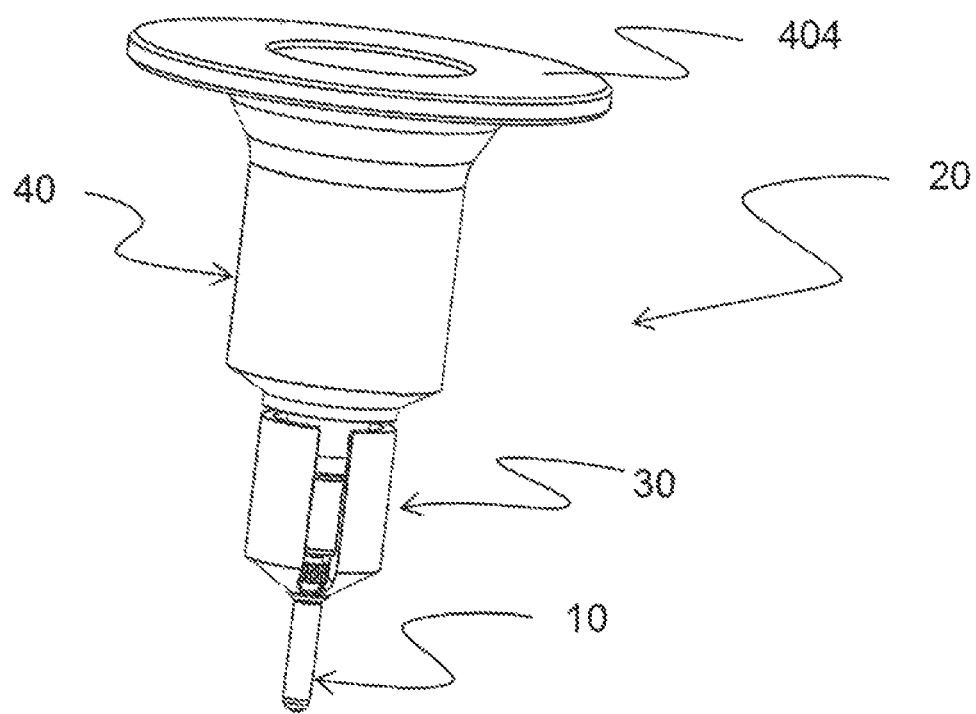
FIG. 3 is a perspective view of an assembly comprising a fastener and a tool according to the invention, assembled together for installation of the fastener.
Figure 4:
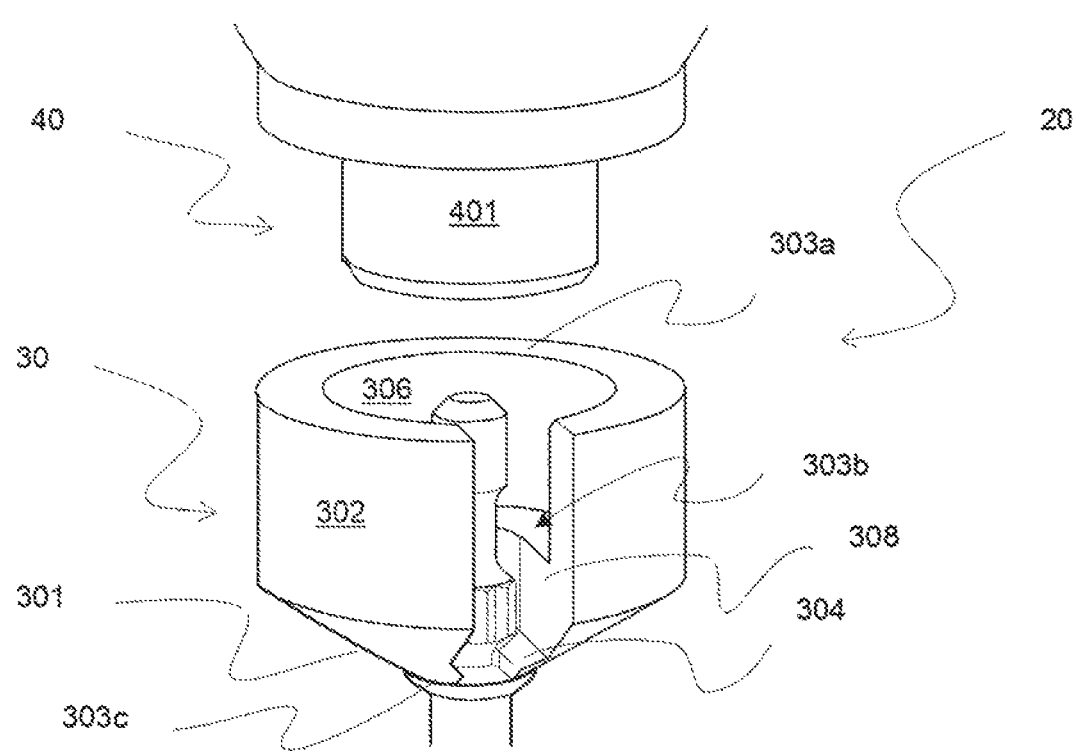
FIG. 4 is a perspective view of an assembly comprising a fastener and a tool according to the invention, prior to placing the second body on the first body.
Figure 5:
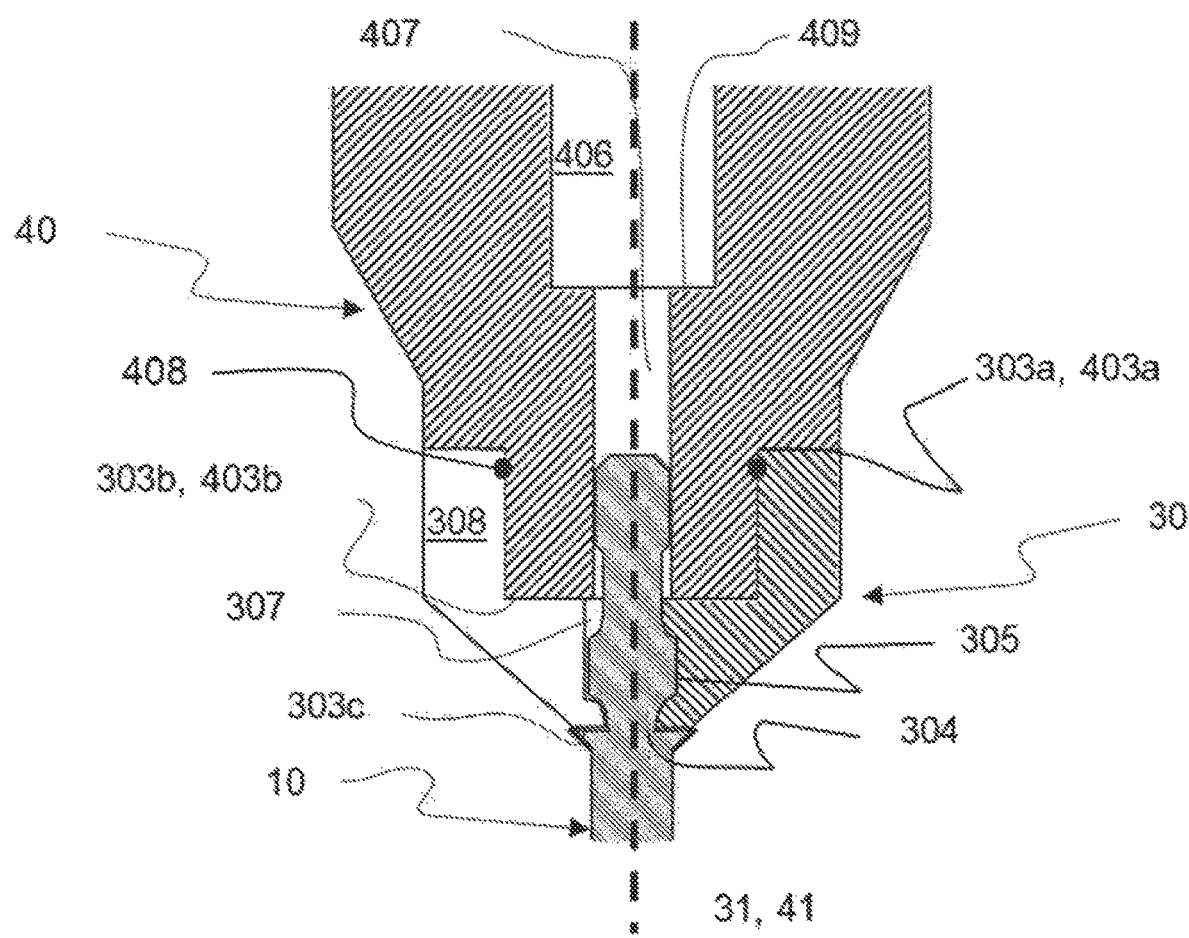
FIG. 5 is a vertical sectional view of an assembly comprising a fastener and a tool according to the invention, assembled together for installation of the fastener.

With reference to FIGS. 3 to 5, a preferred embodiment of a tool 20 according to the invention comprises a first body 30 and a second body 40.

The first body 30 extends along a first main axis 31 and has a base 301 of substantially frustoconical shape extended at its large base by a skirt 302 of substantially cylindrical shape of revolution. The first body 30 thus forms an integral part, substantially of revolution about its first main axis 31.

The first body 30 has a housing extending from a free end of the skirt 302, corresponding to FIGS. 3 to 5 at an upper end of said first body, towards the base 301 along the first main axis. In the example illustrated, the housing corresponds to a counterbore 306. The counterbore 306 extends along the first main axis by a bore 307 opening at a free end of the base 301, corresponding to FIGS. 3 to 5 at a lower end of the first body 30.

The first body 30 also has a groove 308 extending vertically from the free end of the base 301 to the free end of the skirt 302, from the first main axis 31, over the entire thickness of the first body 30, that is to an outer peripheral wall of the first body. The groove 308 thus has a substantially U-shaped cross-section over the entire height of the bore. In FIG. 5 representing a cross-sectional view of the tool 20 according to the invention, the unhatched area of the first body 30 corresponds to the groove 308.

The first body 30 has two load-bearing surfaces and a load-transmitting surface all three in the form of crowns truncated by the groove: a first load-bearing surface 303a at the free end of the skirt 302, a second load-bearing surface 303b at the interface between counterbore 306 and bore 307 and a transmission surface 303c at the free end of the base 301.

The first body 30 also includes a U-shaped neck 304 at the free end of the base 301.

The second body 40 extends along a second main axis 41 and comprises a shaft 401 having substantially a cylindrical sleeve shape adapted to be received in the housing formed by the counterbore 306 of the first body 30. Opposite the free end of the shaft 401, said free end corresponding to FIGS. 3 to 5 at a lower end, the second body 40 has a shoulder defining a first complementary surface 403a. The free surface, corresponding to FIGS. 3 to 5 to a bottom surface, defines a second complementary surface 403b.

In the example illustrated in FIGS. 3 to 5, the second body 40 also includes a counterbore 406 and a bore 407, the counterbore 406 extending from an upper free end of the second body 40, with reference to the figures, and being extended by the bore 407 that extends to a lower free end of said second body, with reference to the figures. With reference to FIG. 3, the second body 40 comprises opposite the shaft 401 an enlarged flange 404.

An average diameter of the bore 307 of the first body 30 is substantially equal to an average bore diameter 407 of the second body 40.

The implementation of the tool 20 for placing the fastener 10 in interference in a structure is detailed below.

The fastener 10 is slid into the first body 30 by the groove 308, such that the gripping element 14 of said fastener is placed inside said first body and that the head 13 and the sleeve are placed outside said first body and both in contact with the transmission surface 303c. The fastener 10 is thus brought into abutment in the first body 30 such that the longitudinal axis 11 of the fastener is substantially coincident with the first main axis 31 of said first body. For this purpose, the inner surface of the bore 307 of the first body 30 has been machined so as to form an at least partially complementary imprint of the gripping element 14. By way of example, a groove 305 as illustrated in FIG. 5 makes it possible to receive a part of the gripping element 14 of the fastener, of complementary shape to said groove. In the same manner, the neck 304 conforms to the shape of the breaking groove 15 of the fastener 10, and retains said fastener in a vertical direction carried, in the figures, by the first main axis 31 of the first body 30.

The second body 40 is then placed over the first body 30 to cover the gripping element 14 of the fastener 10. The bore 407 extending along the second main axis 41 makes it possible to receive said gripping element, such that when the second body 40 is placed on the first body, the first main axis 31, the second main axis 41 and the longitudinal axis 11 of the fastener are substantially coincident.

The diameters of the bores 307 and 407 are adapted to be able to receive the gripping element 14 of the fastener 10. For example, these two diameters are at least greater than the maximum diameter $D_{14}$ of the gripping element, but may also be each adapted to the maximum diameter of the portion of the gripping element 14 which they receive. The bore 407 has, in particular, a function of centering the gripping element 14 and, therefore, the fastener in the tool 20.

When the second body 40 is placed on the first body 30, the first bearing surface 303a is in contact with the first complementary surface 403a and the second bearing surface 303b is in contact with the second complementary surface 403b.

The second body 40 is held assembled to the first body 30, for example by means of an O-ring 408 arranged in a groove of the shaft 401, said O-ring being compressed when the shaft 401 is sleeved in the counterbore 306, for example in a groove intended to receive said O-ring on the cylindrical surface of the counterbore wall 306.

The fastener 10 is positioned in front of a previously made bore in the structures to be joined, having a diameter smaller than an outer diameter of the cylindrical portion 12 of the fastener, and a percussive or continuous load is then applied to a load application surface 409 of the second body 40, by means of a suitable tool, for example a multi-strike tool, in order for the fastener to penetrate into the bore the fastener into the bore. The load application surface 409 corresponds to the bottom of the counterbore 406 of the second body.

In a preferred embodiment, said tool is inserted at least partially into the counterbore 406, so as to be brought into contact with the load application surface 409, whereby the impact load or continuous load is thus applied on said surface for applying a force 409 by means of the tool, said counterbore having the function of maintaining said tool in the center of the tool 20, and the widened flange 404 protecting the hand of an operator holding the tool 20 by the second body 403b. The contacts between the first bearing surface 303a and the first complementary surface 403a, between the second bearing surface 303b and the second complementary surface 403b and between the head 13 of the fastener 10 and the transmission surface 303c make it possible to transfer the impact or continuous load to the fastener 10 in order to insert said fastener into interference in one or a plurality of structures (not shown), without damaging the fastener.

When the underside of the head of the fastener 10 comes into contact with the structure in which said fastener is inserted, said tool is removed by sliding it to disengage, by the groove 308, the gripping element 14 of the first body 30, then another tool can be used to finalize the placement of the fastener into the structure.

It should be noted that it is not necessary that the first bearing surface 303a and the second bearing surface 303b are in contact respectively with the first complementary surface 403a and the second complementary surface 403b; only one of these two contacts is sufficient to implement the fastener by means of the tool according to the invention.

However, it is essential that the transmission surface 303c is designed so as to be in contact with all of the elements forming the head of the fastener, ie both with the head of the screw and with the flange of the sleeve when the fastener 10 is a blind rivet comprising a screw and a sleeve receiving the screw. In fact, the support of the first body 30 only on the sleeve flange would irreversibly damage the sleeve flange upon application of a load. Also, the support of the first body 30 only on the head of the screw would result in a necking of the body of the sleeve: the body of the sleeve would elongate and decrease in thickness, compromising the interference between the fastener and the structure. This configuration is not desirable in particular when interference is sought to discharge electric current potentials in the structures in the event of lightning strike on the head of the fastener or to increase the mechanical strength of the assembly, particularly in fatigue.

Thus, a shape of the load transmission surface 303c of the first body is complementary to a shape of the surface of the head 13 of the fastener oriented towards the gripping element to maximize a contact surface between these two elements.

The tool according to the invention thus makes it possible to install a fastener in interference in a structure without damaging the fastener, the loads being taken up in the majority by the tool, and transmitted to the fastener via the load-bearing surfaces and their complementary surfaces, as well as by the transmission surface.

The tool 20 is preferably made of metallic material to resist the forces of the tool.

In one embodiment not shown, the tool 20 includes an offset handle positioned transversely to the second body 40 to improve the ergonomics of the tool and to avoid the risk of injury if the tool accidentally impacts the enlarged flange 404 instead of the load application surface 409. In this case, the tool 20 may have an enlarged collar of less diameter than in the absence of a handle.

In another embodiment not shown, the first bearing surface 303a and the first complementary surface 403a and/or the second bearing surface 303b and the second complementary surface 403b are frustoconical.

A tool suitable for implementing the insertion method according to the invention does not necessarily comprise two bodies.

In one embodiment, the tool may comprise only the first body in which the second load bearing surface 303b at the interface between the counterbore 306 and the bore 307 constitutes the load application surface that directly receives the load of the tool. In this case, the height of the housing and the load application surface must be dimensioned so that the tool does not come into contact with the gripping element 14, so as not to damage it, and can effectively bear directly on the load application surface formed by the second bearing surface 303b.

Figure 6:
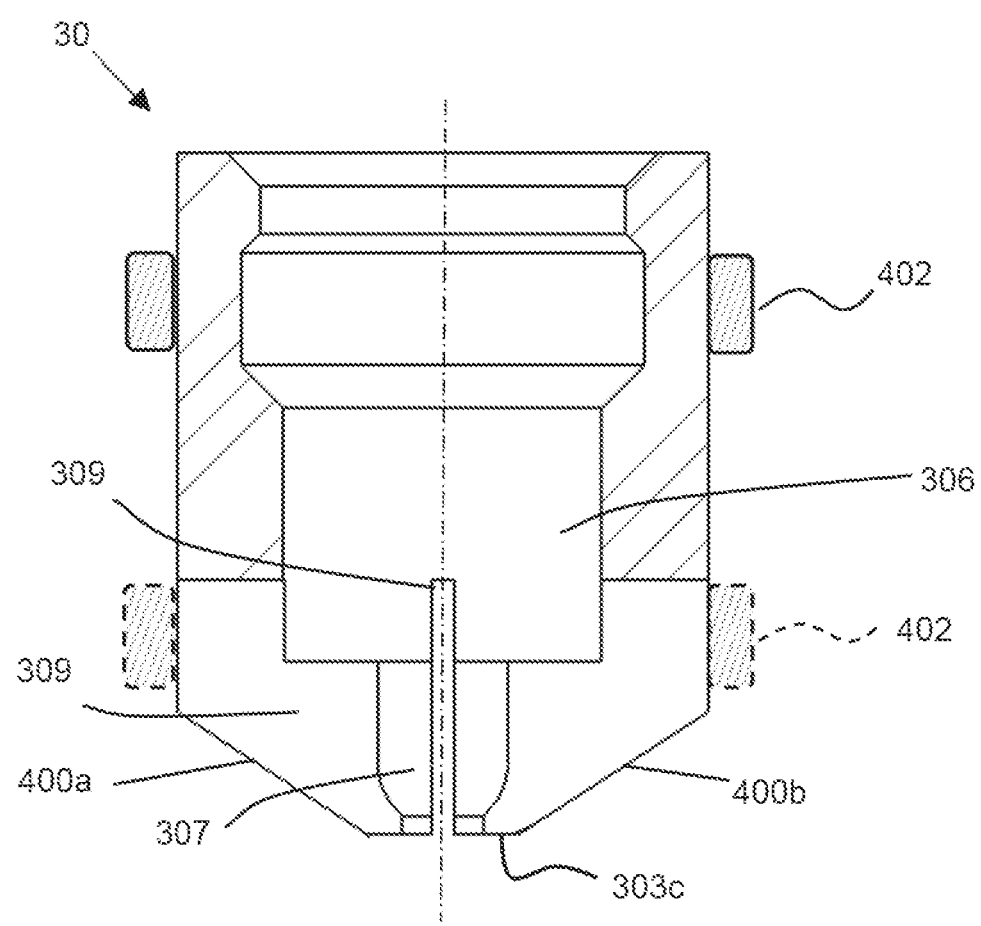
FIG. 6 is a schematic vertical sectional view of a tool according to an embodiment of the invention.

In another embodiment shown in FIG. 6, the tool includes the first body and optionally the second body. In this embodiment, the first body has no longitudinal groove 308, and the bore 307 of the first body is provided with at least two fingers 400 extending in an axial direction, radially flexible, for inserting the gripping element into the housing in an axial direction. The fingers are for example created by making axial slots 309 along a periphery of the bore 307, two slots 309 being illustrated to produce four fingers, 400a and 400b being illustrated in FIG. 6.

It is understood by "radially flexible" that the fingers are flexible to allow radial deformation.

To facilitate insertion of the gripping element into the bore, three, four or more flexible fingers may be provided. To hold the fingers radially inward upon application of the force to the tool, and thus maintain the transmission surface 303c, formed by the free ends of the fingers, in contact with the head 13 of the fastener and the sleeve flange 12, the first body 30 is provided with a clamping means such as a sliding ring 402 on the outer surface of the body, between a position in which the flexible fingers are free to move radially (bold lines), and a position where the movement of the fingers is blocked in all directions (dashed lines). It is understood that the holding of the fingers radially inward can be achieved by any other clamping means, such as an elastic means or a self-tightening means.

What is claimed is:

1. Method for interference insertion of a fastener in a bore of at least one structure, said fastener extending along a longitudinal axis and comprising; a sleeve, said sleeve comprising a flange; a head housed in the sleeve flange and a gripping element, said insertion method being characterized in that it comprises the following steps:
   supply of a tool comprising a load application surface, said load application surface being adapted to receive a percussive or continuous load,
   said tool comprising a first body extending along a first main axis and having:
      at least one load-bearing surface;
      a load transmission surface; and
      a housing extending along the first main axis from a first end of said first body, said housing being extended along the first main axis by a bore extending from said housing to a second end of said first body;
   the load transmission surface being arranged at the second end of the first body and extending perpendicular to the first main axis, said load transmission surface being dimensioned so as to be able to bear simultaneously on the fastener head and the sleeve flange;
   placing the fastener in the first body, along the main axis of said first body, so as to bring the head of the fastener and the sleeve flange into contact with the load transmission surface;
   positioning the tool and the fastener facing the bore of the structure;
   applying a percussive or continuous load to the load application surface of said tool to interference fit the fastener into the bore of the structure.

2. The interference insertion method according to claim 1, characterized in that, when placing the fastener in the first body, the gripping element of the fastener is received in the bore of said first body.

3. The interference insertion method according to claim 2 wherein the tool comprises a second body extending along a second main axis, said second body comprising a shaft of substantially complementary shape to the housing of the first body, said second body having at least one complementary surface to the at least one bearing surface and a bore extending along the second main axis from a first end of said second body, characterized in that a second body is placed on the first body, so as to contact at least one load-bearing surface of the first body with at least one complementary surface of the second body.

4. The interference insertion method according to claim 3, characterized in that the load is applied by means of the tool on the load application surface of the first body or the second body.

5. The interference insertion method according to claim 1 wherein the tool comprises a second body extending along a second main axis, said second body comprising a shaft of substantially complementary shape to the housing of the first body, said second body having at least one complementary surface to the at least one bearing surface and a bore extending along the second main axis from a first end of said second body, characterized in that a second body is placed on the first body, so as to contact at least one load-bearing surface of the first body with at least one complementary surface of the second body.

6. Tool adapted to be used for interference insertion according to claim 1 of a fastener in a bore of at least one structure, said fastener comprising a sleeve comprising a flange, a head housed in the sleeve flange and a gripping element, said tool comprising a first body extending along a first main axis and having: a load application surface adapted to receive a percussive or continuous load: at least one load-bearing surface, a load transmission surface; and a housing extending along the first main axis from a first end of said first body, said housing being extended along the first main axis by a bore extending from said housing to a second end of said first body; said tool being characterized in that the load transmission surface is arranged at the second end of the first body and extends perpendicular to the first main axis, said load transmission surface being dimensioned so as to be able to bear simultaneously on the head and the sleeve flange; the load transmission surface is arranged at the second end of the first body and extends perpendicular to the first main axis, said load transmission surface being dimensioned so as to be able to bear simultaneously on the fastener head and the sleeve flange.

7. Tool according to claim 6, characterized in that the first body comprises a groove extending all along said first body in a direction of the first main axis, and from the first main axis to an outer wall of said body in a radial direction.

8. Tool according to claim 7, characterized in that the second end of the first body has a U-shaped neck.

9. Tool according to claim 6, characterized in that the second end comprises at least two radially flexible fingers.

10. Tool according to claim 6, characterized in that the housing is a counterbore with a diameter greater than an average diameter of the bore, a bottom of said counterbore forming the load-bearing surface and/or the load application surface.

11. Tool according to claim 6, wherein the tool comprises a second body extending along a second main axis, said second body comprising a shaft of substantially complementary shape to the housing of the first body, said second body having at least one complementary surface to the at least one bearing surface and a bore extending along the second main axis from a first end of said second body.

12. Tool according to claim 11, characterized in that the shaft has substantially the shape of a cylindrical sleeve with an outer diameter substantially equal to that of the counterbore and an inner diameter substantially equal to the average diameter of the bore.

13. Tool according to claim 11, characterized in that the shaft of the second body comprises a groove on its outer wall in which is placed an O-ring able to be received in a groove of a wall of the housing of the first body.

14. Tool according to claim 11, characterized in that the second body comprises a counterbore, a bottom of which forms the load application surface.

15. Assembly comprising a tool according to claim 6 and a fastener comprising a head housed in a sleeve flange and a gripping element.

16. Assembly according to claim 15, characterized in that the shapes of the housing and the bore of the first body are at least partially complementary to a shape of the gripping element of the fastener, in order to allow the implementation of the fastener in the first body along the main axis of said first body.

* * * * *